United States Patent Office 3,331,770
Patented July 18, 1967

3,331,770
HYDROGENATION AND ABSORPTION FOR THE REMOVAL OF SULFUR COMPOUNDS
Robert George Cockerham, Solihull, England, assignor to The Gas Council, London, England, a corporation of Great Britain
No Drawing. Filed Dec. 21, 1964, Ser. No. 420,121
Claims priority, application Great Britain, Dec. 23, 1963, 50,807/63
15 Claims. (Cl. 208—212)

This invention relates to the purification of hydrocarbon distillate oils such as petroleum distillate. The invention, as applied to hydrocarbon distillate oils such as light petroleum distillate or kerosine, is concerned with the reduction of the sulphur content to extremely small values. The term "sulphur content" includes sulphur present in elemental or compound form or both.

Such distillates may be gasified catalytically to provide a combustible gas, or town gas, and when a catalyst which may be deactivated by contact with sulphur-containing gases or vapours is used, it is desirable to ensure that the amount of sulphur which comes into contact with the catalyst is as small as possible.

This reduction in the amount of sulphur can be effected by processes which consist, first, of passage of the distillate vapour mixed with a hydrogenating gas at elevated temperature and pressure over a catalyst whereby the sulphur present is converted by hydrogenation to hydrogen sulphide, and secondly, of removal of the hydrogen sulphide. In this process, the hydrogen sulphide may be removed as a result of chemical reaction with a solid reagent which acts as an absorber. Conventional commercial catalysts usually contain molybdenum as active metal and are supported on alumina and promoted by cobalt. Suitable absorbers include metallic oxides (e.g. iron oxide) and the operations of sulphur conversion and absorption may be at similar temperatures and pressures.

The hydrogenating gas which is available may contain carbon monoxide and/or carbon dioxide; these oxides limit the capability of the process to produce distillate of the required purity. The oxides of carbon may have two effects. First, they may impair the activity of a molybdenum-containing catalyst so that small quantities of the sulphur compounds initially present in the distillate vapour may not be converted into hydrogen sulphide. Since these sulphur compounds are incapable of being absorbed by an absorber, such as a metallic oxide, they may survive to contaminate the treated distillate. There is described and claimed in our co-pending application No. 303,414 a process for the purification of light distillates by the removal of sulphur therefrom which process comprises treating the light distillate with a hydrogenating gas containing oxides of carbon in the presence of an hydrodesulphurisation catalyst comprising molybdenum supported on alumina with nickel as a catalyst promotor to convert the sulphur present in the distillate into hydrogen sulphide, the hydrogen sulphide formed being subsquently removed from the treated distillate. Such catalysts tend to mitigate the impairment of activity referred to above.

The present invention is concerned with the second effect, viz., that carbonyl sulphide may be formed over the conversion catalyst by the following reactions:

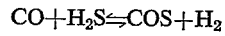

which reactions may proceed to equilibrium. If the carbonyl sulphide is not removed by the absorber it will contaminate the treated distillate which is then no longer sulphur-free.

In the presence of some absorbers, such as iron oxide preparations, it is found that, once the hydrogen sulphide has been absorbed, the reactions proceed in the reverse direction and the carbonyl sulphide which has been formed is converted to hydrogen sulphide, which is then absorbed. There is thus established in the absorber, downstream of the regions in which sulphiding has been completed and in which absorption of the hydrogen sulphide which enters the vessel from the catalytic conversion stage is proceeding, a zone in which carbonyl sulphide is being decomposed, the hydrogen sulphide then produced being immediately absorbed, so that decomposition proceeds to completion by virtue of the continuous displacement of the equilibrium. The zone has a depth which depends on a number of factors but, in particular, is greater the greater the carbon monoxide and carbon dioxide content of the hydrogenating gas and the greater the sulphur content of the unpurified distillate. Since the amounts of carbonyl sulphide formed represent a small proportion (e.g., 1 percent) of the amount of sulphur in the distillate the amount of hydrogen sulphide to be absorbed in the zone is small in relation to that produced from the sulphur compounds in the distillate.

The zone is progressively displaced downstream by virtue of the consumption of iron oxide by hydrogen sulphide entering the absorption vessel, and its downstream boundary necessarily approaches the downstream boundary of the absorbing material before this material has become fully saturated by the absorption of the hydrogen sulphide entering the absorption vessel. It is therefore necessary when operating with one conversion and one absorption vessel to replace the absorption vessel by a freshly charged one before the full capacity of the absorber has been utilised.

In our co-pending application No. 303,414 we have described the purification of light distillates containing up to 250 p.p.m. sulphur employing one conversion and one absorption stage, using hydrogenating gas containing up to 5 percent carbon oxides. In this case the sacrifice of capacity of the absorber is not serious; it amounts to at most about 15 percent of the volume of the charge at usual rates of throughput, for example 0.2–0.8 lb. of distillate per lb. of absorber per hour.

However, it is desirable to extend the purification process by using as hydrogenating gas a gas containing higher concentrations of carbon oxides relatively to hydrogen such as percentages by volume which are greater than 5% of, and may attain or exceed 15 percent by volume on the volume of the hydrogen for the treatment of distillates containing the same concentrations of sulphur, or higher concentrations, such as 500 p.p.m. It has been found in such cases that the zone of reconversion of carbonyl sulphide may become so deep that the absorption vessel has to be changed when only a small proportion of the absorbing material has been saturated, or even that operation with a single absorption vessel becomes impracticable.

We have now found a means for the purification from sulphur of distillate oils and, in particular, for the attainment of a high degree of purity, for example 0.2 p.p.m. of sulphur or less, without sacrifice of the capacity of the absorber.

According to the present invention there is provided a process for the purification of a hydrocarbon distillate oil, in particular light distillate oil which contains sulphur by the removal of sulphur therefrom which process comprises a conversion stage in which the distillate vapour mixed with a hydrogenating gas containing oxides of carbon is reacted in the presence of a hydrodesulphurisation catalyst to convert the sulphur present in the distillate to hydrogen sulphide, and at least two separated absorption stages, in each of which the mixture of gases and vapours resulting from the conversion stage is passed over a mass of material for absorbing hydrogen sulphide, whereby the sulphur content of the mixture is reduced to the desired degree.

The treatment of the hydrocarbon distillate may be carried out under pressure at elevated temperatures, for example from 250° to 450° C. and at pressures of from 5 atmospheres upwards subject to the hydrocarbon being in the vapour phase. A particularly preferred pressure range is from 10 to 50 atmospheres.

The hydrogen sulphide may be absorbed by any suitable absorbing material capable of operation at temperatures similar to those used in the conversion stage, for example, active iron oxide, such as the iron oxide sold under the trade name "Luxmasse."

The invention may be applied to a variety of light distillates e.g. to straight run naphthas having boiling points of the order of 30 to 200° C. The range of distillates includes kerosene boiling up to about 285° C. on the average, and those distillates whose boiling points are lower than that of kerosene. It is to be understood that the distillate may include unsaturated hydrocarbons which in the process are hydrogenated to paraffins.

It will be understood that to achieve optimum results it is necessary for there to be a substantial excess of hydrogen in addition to that necessary to react with the sulphur compounds, in order to displace the equilibrium compositions in the hydrogenation of the sulphur compounds as far towards hydrogen sulphide as possible, and to react with the unsaturated hydrocarbons which may be present in the distillate and with oxides of carbon in the hydrogenating gas. The allowance made for the possibility of reaction with carbon oxides should be not less than four times the amount of carbon dioxide together with not less than three times the amount of carbon monoxide on a volumetric basis.

The hydrogenating gas employed in the hydrodesulphurisation process may be of any normal commercial variety, for example hydrogen-containing gases made by gasification processes and containing only 20 percent by volume of hydrogen, the remainder comprising carbon monoxide, carbon dioxide, methane and nitrogen subject to the above mentioned restriction of proportions.

The invention is particularly applicable in cases wherein the hydrogenating gas contains more than 5% of carbon oxides based on the volume of hydrogen present, e.g. 15% or more of carbon oxides.

The preferred initial ratio of the hydrogen to distillate is from 0.5 to 1 cu. ft. (measured at 15.5° C. and 762 mm. Hg saturated) per lb. Certain higher boiling light distillates, and kerosene, require a higher proportion of hydrogen, of up to 2 or 3 cu. ft. per lb.

A preferred catalyst for the conversion of the sulphur present in the distillate to hydrogen sulphide is one comprising molybdenum supported on alumina with nickel as a catalyst promoter.

When the sulphur content of the distillate and the concentration of oxides of carbon in the hydrogenating gas do not greatly exceed the limits described above with reference to the use of a single catalytic conversion stage and a single absorption stage, the desired degree of purity may be obtained by the use of an embodiment of the invention which comprises passing the mixture of gases and vapours leaving the first absorption stage through one further absorption stage.

Thus, in a particular form the invention provides a process for the purification of light distillate or kerosene which contains sulphur, which process comprises mixing the light distillate vapour with a hydrogenating gas containing oxides of carbon, reacting the mixture in the presence of a hydrodesulphurisation catalyst to convert the sulphur present to hydrogen sulphide, passing the resulting mixture of gases and vapours over a charge A of material for absorbing hydrogen sulphide passing the resulting mixture, if it still contains sulphur, over a subsequent charge B of material for absorbing hydrogen sulphide and, when the material of charge A has absorbed sufficient hydrogen sulphide, removing the charge A from contact with the flow of gases, and vapours and placing a fresh charge C of material for absorbing hydrogen sulphide in contact with the flow of gases and vapours downstream of the charge B, whereby the sulphur content of the mixture is reduced to the desired degree. Suitable pipes and valves are provided to enable the manipulations described to be effected, but alternatively, a total of three absorption vessels may be used of which two are in use at any one time. By this process the sulphur content of the purified light distillate can be reduced, for example, to below 0.2 p.p.m.

A further process in accordance with the invention is preferred when the concentrations of sulphur in the light distillate and of oxides of carbon in the hydrogenating gas substantially exceed the values described above with reference to the use of a single catalytic conversion stage and a single absorption stage, for example when they reach 500 p.p.m. of sulphur in the distillate and 15 percent or more of oxides of carbon by volume on the volume of hydrogen. Under these conditions the zone of carbonyl sulphide decomposition may become inconveniently deep even for operation with one catalytic conversion stage and two absorption stages; it may even extend into the second vessel when saturation of the absorber has only started at the top of the first one, and may approach the downstream boundary of the second one before saturation of the absorber in the first one has been attained. The procedure of using a third absorption vessel is cumbersome and inconvenient. In such instances, the present invention provides a process which comprises passing the mixture of gases and vapours leaving the first absorption stage through one further separate catalytic conversion stage and one further separate absorption stage.

In this form of the invention, advantage is taken of the fact that the reactions

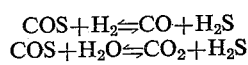

$$COS+H_2 \rightleftharpoons CO+H_2S$$
$$COS+H_2O \rightleftharpoons CO_2+H_2S$$

proceed much more rapidly in the presence of a catalyst such as is used in the first conversion stage, for example, a catalyst comprising molybdenum supported on alumina with nickel as a catalyst promoter, than they do in the presence of the absorber.

Thus, the mixture of gases and vapours passes through four separate stages, so that the mixture is subjected to a first catalytic treatment stage, a first absorption stage, a second catalytic treatment stage, and a second absorption stage, in this order. When the mixture of gases and vapours leaves the first catalytic treatment stage, it contains carbonyl sulphide formed over the catalyst. When the mixture enters the first absorption stage, all the hydrogen sulphide is completely removed. In consequence, the carbonyl sulphide can decompose by the reversal of the above reactions and, in accordance with this invention, this is effected, insofar as it has not occurred in the first absorption stage, in the reconversion zone, by providing a second catalytic treatment stage to reconvert the carbonyl sulphide to hydrogen sulphide, which is absorbed in a second absorption stage, together with hydrogen sulphide formed in this absorption stage by the decomposition of final traces of carbonyl sulphide over the absorber. In this way the desired degree of purity in the treated distillate can be attained.

Accordingly, a particular alternative form of the invention provides a process for the purification of light distillate or kerosene which contains sulphur, which process comprises a first conversion stage in which the light distillate vapour mixed with a hydrogenating gas containing oxides of carbon, is reacted in the presence of a hydrodesulphurisation catalyst to convert the sulphur present to hydrogen sulphide, an absorption stage in which the mixture of gases and vapours resulting from the first conversion stage is passed over a charge A of material for absorbing hydrogen sulphide, these stages being followed, if the resulting mixture still contains sulphur, successively by a second conversion stage and a further absorption stage involving a charge B of absorbent material wherein the absorbent material of charge A has absorbed sufficient hydrogen sulphide, charge B is switched to a position between the first and second conversion stages in the flow of gases and vapours, charge A is removed from the flow of gases and vapours, and a fresh charge C of material for absorbing hydrogen sulphide is placed in contact with the flow of gases and vapours downstream of the second conversion stage, whereby the sulphur content of the mixture is reduced to the desired degree. Suitable pipes and valves are provided to enable the manipulations described to be effected.

The advantages of this procedure are; that the absorber in the second stage is exposed only to the low partial pressure of hydrogen sulphide arising from the small concentration of carbonyl sulphide reaching the second catalytic treatment stage, so that its absorptive capacity may not be fully utilized if it is never employed in the first stage; that the lowest concentration of hydrogen sulphide is being absorbed by the freshest absorbing material; and that, in favourable circumstances, the capacity of the second stage absorption vessel when it is first moved into the first stage position may be sufficient to enable the exhausted one to be recharged and placed in the second position, before carbonyl sulphide reaches the second conversion stage, so eliminating the need for using a set of three absorptive vessels, of which two are on stream at any one time, which is a possible alternative procedure.

It will be understood that the operations of changing the positions of absorption vessels or recharging them may allow incompletely purified distillate to pass temporarily into the outlet pipe. This can be overcome by the inclusion of a small vessel containing absorber in the outlet pipe.

The processes of the present invention not only make possible a high degree of purity, but also permit the maximum use of the absorbers.

It will be understood that the invention also includes the use of further successive stages of conversion and absorption, for example, a third pair of stages, should sulphur concentrations in the oil treated and carbon oxide concentrations in the hydrogenating gas become so high as to make their use desirable. With light distillate or kerosene containing the normal concentration of sulphur compounds, and with hydrogenating gas containing up to 15 percent of carbon oxides by volume on the volume of hydrogen, two pairs of stages will generally be sufficient for the attainment of the highest purity, say 0.2 p.p.m. of sulphur or less.

Following are examples which illustrate the process according to the invention:

*Example I*

Distillate of final boiling point 165° C. containing 220 p.p.m. of sulphur was purified by being reacted with a hydrogenating gas over a hydrodesulphurisation catalyst and by being subsequently passed over a single mass of material for absorbing hydrogen sulphide. The arrangement was thus a single-stage system:

Conversion catalyst ("Nimox")
Absorber ("Luxmasse")

"Nimox" is a hydrodesulphurisation catalyst containing molybdenum supported on alumina and promoted by nickel. "Luxmasse" is a commercial material, predominantly iron oxide obtained as a by-product in the production of aluminium from bauxite.

Pressure, p.s.i.g. _____ 350
Temperatures, ° C.:
  "Nimox" _____ 350
  "Luxmasse" _____ 300
Oil throughput through both stages, lbs./cu. ft./hour _____ 130
Composition of hydrogenating gas, percent by volume:
  CO _____ 11.5
  $H_2$ _____ 87.7
  $N_2$ _____ 0.8
                                                          100.0

$$\frac{[(CO)+(CO_2)]\times 100}{(H_2)}=13.1$$

Hydrogenating gas rate, cu. ft./lb. distillate:
  Gas _____ 0.77
  Hydrogen in gas _____ 0.675

For 163 hours a hydrogen sulphide-free distillate containing less than 0.2 p.p.m. of sulphur was produced. Then, the first slip of hydrogen sulphide was observed showing that the leading boundary of the absorption zone had passed the end of the bed of "Luxmasse."

The absorbing material was analysed and found to contain 13.2 percent by weight of sulphur, i.e., 66 percent of the theoretical capacity.

This experiment can be compared with one in which the hydrogenating gas contained only 5 percent of carbon monoxide, other conditions being the same. After the absorption zone front had passed the end of the bed of "Luxmasse," the material was found to contain 18.8 percent by weight of sulphur, i.e. 94 percent theoretical capacity.

These results show that in the first experiment the absorption zone occupied about one-third of the depth of the bed, while in the second it occupied about 6 percent of it.

In the first experiment, the absorptive capacity of the "Luxmasse" could have been fully used consistently with the production of acceptably pure distillate had a second absorption vessel been on stream following the first one. In the second experiment, the utilisation of the absorbing material (94 percent theoretical) can be regarded as adequate.

*Example II*

A distillate, specific gravity 0.72, final boiling point 177° C., of sulphur content 500 p.p.m. was purified in this sequence of stages:

(1) Conversion, "Nimox"
    (2) Absorption, "Luxmasse"
    (3) Conversion, "Nimox"
    (4) Absorption, "Luxmasse"

Temperature, ° C. throughout _____ 375
Pressure, p.s.i.g. _____ 400

Composition of hydrogenating gas, percent by volume:
  $CO_2$ _____ 1.0
  CO _____ 1.55
  $H_2$ _____ 23.9
  $CH_4$ _____ 73.55
                                                          100.0

$$\frac{[(CO_2)+(CO)]\times 100}{(H_2)}=10.6$$

Oil throughout, lbs./cu. ft./hr.:
  Stage—
    1 ("Nimox") _____ 70
    2 ("Luxmasse") _____ 18
    3 ("Nimox") _____ 70
    4 ("Luxmasse") _____ 18
Hydrogenating gas rate, cu. ft./lb. oil:
  As gas _____ 2.90
  As hydrogen in gas _____ 0.7

After 107 hours' operation, the distillate leaving the first absorber (Stage 2) contained 1.0 p.p.m. of sulphur while that leaving the second stage contained 0.14 p.p.m.

The example illustrates the process in which two conversion stages are used, and shows the value of the procedure when the sulphur content of the feedstock is high and the proportion of hydrogen in the gas is low.

*Example III*

A distillate, specific gravity 0.71, containing 500 p.p.m. of sulphur, of which at least 500 p.p.m. was as thiophen, was purified in the sequence of stages:

(1) Conversion, "Nimox"
  (2) Absorption, "Luxmasse"
  (3) Conversion, "Nimox"
  (4) Absorption, "Luxmasse"

Temperature, ° C. throughout _____ 350
Pressure, p.s.i.g. _____ 350

Composition of hydrogenating gas, percent by volume:
  $CO_2$ _____ 6.75
  $CO$ _____ 5.5
  $CH_4$ _____ 22.3
  $H_2$ _____ 65.0
  $N_2$ _____ 0.45
                                        ─────
                                        100.0

$$\frac{[(CO_2)+(CO)]\times 100}{(H_2)} = 18.8$$

Oil throughout, lbs./cu. ft./hr.:
  All stages _____ 130
Hydrogenating gas rate, cu. ft./lb. oil:
  As gas _____ 0.8
  As hydrogen in gas _____ 0.54

Distillate free from hydrogen sulphide and containing less than 0.2 p.p.m. of sulphur was produced at the outlet of the last stage. When the first absorber ceased to absorb hydrogen sulphide, the absorption vessel in position 4 was placed in position 2 and the spent purifying material in the first absorber was discharged. The vessel was recharged with fresh absorbing material and placed in position 4 and the production of purified distillate resumed.

The spent purifying material which had been discharged from the first absorption vessel was found to contain 20.1 percent of sulphur, the theoretical maximum amount.

The experiment was continued for a time equal to the duration of the first period (before vessel rearrangement) always with the production of hydrogen sulphide-free distillate containing less than 0.2 p.p.m. sulphur. At the end of the experiment the "Luxmasse" in the first absorber contained 18.6 percent of sulphur by weight and the second contained 0.6 percent by weight.

*Example IV*

Apparatus and conditions were identical with those of Example III except that the pressure was 150 p.s.i.g. The experiment was continued up to the time at which hydrogen sulphide absorption in the first absorption stage ceased, and throughout it, distillate was produced of the same purity as in Example III. The absorbing materials in the first and second absorption stages were discharged and found to contain 20.0 percent of sulphur and 0.25 percent respectively.

The processes described secure purification of light petroleum distillate and kerosene, to the degree required for catalytic gasification, when the hydrogenating gas contains a low proportion of hydrogen, and even when it contains a high proportion of oxides of carbon, while providing means for economic and even complete utilisation of the capacity of the absorbing materials.

I claim:

1. A process for the purification of a hydrocarbon distillate oil which has a high content of sulphur by the removal of sulphur therefrom which process comprises a conversion stage in which the distillate vapours, mixed with a hydrogenating gas containing more than 5% by volume of oxides of carbon based of the volume of hydrogen, are reacted in the presence of a hydrodesulphurisation catalyst to convert the sulphur present in the distillate to hydrogen sulphide, and at least two separated absorption stages, in each of which the mixture of gases and vapours resulting from the conversion stage is passed over a mass of material for absorbing hydrogen sulphide both said stages being conducted at elevated hydrogenating temperatures, whereby the sulphur content of the mixture is reduced to the desired degree.

2. A process as claimed in claim 1 wherein the purification is effected at a temperature of from 250° C. to 450° C.

3. A process as claimed in claim 1 wherein the purification is effected at a pressure of from 10 to 25 atmospheres.

4. A process as claimed in claim 1 wherein the hydrodesulphurisation catalyst comprises molybdenum supported on alumina with nickel as a catalyst promoter.

5. A process as claimed in claim 1 wherein the material for absorbing hydrogen sulphide comprises active iron oxide.

6. A process as claimed in claim 1 wherein the distillates are straight run naphthas having initial boiling points above about 30° C., and final boiling points below 200° C.

7. A process as claimed in claim 1 wherein the distillates are kerosene having final boiling points of up to about 285° C.

8. A process as claimed in claim 1 wherein the hydrogenating gas contains more hydrogen than four times the amount of carbon dioxide together with three times the carbon monoxide on a volumetric basis.

9. A process as claimed in claim 1 wherein the ratio of hydrogen to distillate in the initial mixture of hydrogenating gas and distillate is from 0.5 to 3 cubic foot (measured at 15.5° C. and 762 mm. of mercury saturated) per pound.

10. A process as claimed in claim 1 wherein the mixture of gases and vapours is passed over a hydrodesulphurisation catalyst between two absorptive stages to convert sulphur present in the mixture into hydrogen sulphide.

11. A process as claimed in claim 1 comprising at least 3 successive pairs of conversion and absorption stages.

12. A process for the purification of a distillate oil which has a high content of sulphur selected from the group consisting of light distillate and kerosene, which process comprises mixing the distillate vapour with a hydrogenating gas containing more than 5% by volume of oxides of carbon, based of the volume of hydrogen reacting the mixture in the presence of a hydrodesulphurisation catalyst to convert the sulphur present to hydrogen sulphide, passing the resulting mixture of gases and vapours over a charge A of material for absorbing hydrogen sulphide passing the resulting mixture, over a subsequent charge B of material for absorbing hydrogen sulphide and, when the material of charge A has absorbed sufficient hydrogen sulphide, removing the charge A from contact with the flow of gases and vapours, and placing a fresh charge C of material for absorbing hydrogen sulphide in contact with the flow of gases downstream of the charge B, said hydrogen sulphide absorbing steps being conducted under elevated hydrogenating temperatures whereby the sulphur content of the mixture is reduced to the desired degree.

13. A process for the purification of a distillate oil which has a high content of sulphur selected from the group consisting of light distillate and kerosene which process comprises a first conversion stage in which the distillate vapour mixed with a hydrogenating gas containing more than 5% by volume of oxides of carbon, based of the volume of hydrogen is reacted in the presence of a hydrodesulphurisation catalyst to convert the sulphur present to hydrogen sulphide, an absorption stage in which the mixture of gases and vapours resulting from the first conversion stage passes over a charge A of material for absorbing hydrogen sulphide, these stages being followed, successively by a second conversion stage and a further absorbing stage involving a charge B of absorbent material, wherein when the absorbent material of charge A has absorbed sufficient hydrogen sulphide, charge B is switched to a position between the first and second conversion stages in the flow of gases and vapours, charge A is removed from the flow and a fresh charge C of material for absorbing hydrogen sulphide placed in contact with the flow of gases and vapours downstream of the second conversion stage said absorption stages being conducted under elevated hydrogenating temperatures, whereby the sulphur content of the mixture is reduced to the desired degree.

14. A process as claimed in claim 12 wherein the fresh charge C is contained in the same vessel as contained charge A.

15. A process as claimed in claim 13 wherein the fresh charge C is contained in the same vessel as contained charge A.

References Cited

UNITED STATES PATENTS

| | | | |
|---|---|---|---|
| 2,769,763 | 11/1956 | Annable et al. | 208—212 |
| 2,897,142 | 7/1959 | Jacobs et al. | 208—212 |
| 2,925,375 | 2/1960 | Heck et al. | 208—212 |
| 2,959,538 | 11/1960 | Weikart et al. | 208—212 |
| 3,011,967 | 12/1961 | Schmitkons et al. | 208—139 |
| 3,063,936 | 11/1962 | Pearce et al. | 208—212 |

DELBERT E. GANTZ, *Primary Examiner.*

SAMUEL P. JONES, *Examiner.*